United States Patent

Maruo

Patent Number: 6,163,619
Date of Patent: *Dec. 19, 2000

[54] METHOD OF IMAGE PROCESSING

[75] Inventor: Kazuyuki Maruo, Sendai, Japan

[73] Assignee: Advantest Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/938,705

[22] Filed: Sep. 26, 1997

[30] Foreign Application Priority Data

Oct. 4, 1996 [JP] Japan ................................ 8-264804

[51] Int. Cl.$^7$ ........................................ G06K 9/00
[52] U.S. Cl. ..................... 382/141; 382/149; 382/240; 382/260
[58] Field of Search ................... 382/141, 145, 382/144, 149, 207, 237, 260, 263, 264, 275, 277, 240

[56] References Cited

U.S. PATENT DOCUMENTS

| | | |
|---|---|---|
| 5,504,438 | 4/1996 | Henley ................................ 324/158 |
| 5,586,058 | 12/1996 | Aloni et al. ........................... 382/148 |
| 5,598,481 | 1/1997 | Nishikawa et al. .................... 382/180 |
| 5,650,844 | 6/1997 | Aoki et al. ............................ 356/237 |
| 5,691,764 | 11/1997 | Takekoshi et al. ..................... 348/125 |
| 5,717,780 | 2/1998 | Mitsumune et al. ................... 382/141 |
| 5,790,694 | 8/1998 | Maruo .................................. 382/149 |
| 5,799,100 | 8/1998 | Clarke et al. ......................... 382/132 |
| 5,815,198 | 9/1998 | Vachtsevanos et al. ............... 348/88 |

OTHER PUBLICATIONS

Jerome M. Shepin Embedded Image Coding Using Zerothie of Wavelet Coefficients IEEE vol. 41, Dec. 12, 1993.

*Primary Examiner*—Matthew C. Bella
*Assistant Examiner*—Sheela Chawan
*Attorney, Agent, or Firm*—Staas & Halsey LLP

[57] ABSTRACT

An input digital image data is subject to a Wavelet transform on a screen on which the image is formed, an image energy quantity for a combined area of X-axis high pass information and Y-axis high pass information contained in the image data which results from the Wavelet transform is calculated, and it is determined if an object being examined is acceptable or faulty depending on whether the image energy quantity is below or above a given value.

9 Claims, 6 Drawing Sheets

FIG.4A
a(i)   0 0 0 0 4 4 0 0 0 0 4 4 0 0 0 0 4 4 0 0 0 0 4 4 0 0 0 0 4 4 0 0 0 0 4 4 0 0 0 0
       a(0)        a(10)        a(20)        a(30)        a(39)

FIG.4B
b(i)   0 0 4 0 0 4 0 0 4 0 0 4 0 0 4 0 0 4 0 0 0 0 0 0 0 0 0 0 0 0 0 0 0 0 0 0 0 0 0 0
       b(0)    LEVEL 1        b(19) b(20)    LEVEL 1        b(39)
               LOW PASS                      HIGH PASS
               COMPONENT                     COMPONENT

FIG.4C
c(i)   0 2 2 0 2 2 0 2 2 0 0 2 -2 0 2 -2 0 2 -2 0 0 0 0 0 0 0 0 0 0 0 0 0 0 0 0 0 0 0 0 0
       c(0)        c(9) c(10)        c(19) c(20)    LEVEL 1        c(39)
       LEVEL 2           LEVEL 2                    HIGH PASS
       LOW PASS          HIGH PASS                  COMPONENT
       COMPONENT         COMPONENT

FIG.4D
d(i)   0 0 0 0 4 4 0 0 8 0 4 4 0 0 0 0 4 4 0 0 0 0 4 4 0 0 8 0 4 4 0 0 8 0 4 4 0 0 8 0
       d(0)        d(10)        d(20)        d(30)        d(39)

FIG.4E
e(i)   0 2 4 0 2 2 2 2 4 2 0 2 0 0 2 -2 -2 2 0 -2 0 0 0 0 4 0 0 0 0 0 0 0 4 0 0 0 4 4 0 4
       e(0)        e(9) e(10)        e(19) e(20)    LEVEL 1        e(39)
       LEVEL 2           LEVEL 2                    HIGH PASS
       LOW PASS          HIGH PASS                  COMPONENT
       COMPONENT         COMPONENT

METHOD OF IMAGE PROCESSING

BACKGROUND OF THE INVENTION

1. Field of the Invention

The invention relates to a method of image processing which may be used in an image quality inspection unit such as an LCD (liquid crystal display) tester or CCD tester which utilizes an image to inspect an object being examined or in an image recognition apparatus in which an object being examined is recognized through an image thereof.

2. Description of the Related Art

A number of image processing techniques are available in the art in which an image is utilized in rendering an inspection, recognition, decision or diagnosis of or about an object being examined. Most of these techniques utilize digital images which are subject to digital image processing in a computer.

A digital image which is processed in an image quality inspection process as employed in an LCD tester or CCD tester comprises an assembly of picture elements in the image, each having a plurality of gradation levels such as 256 or 1024 gradations, for example, arrayed such that 640 picture elements are contained in the direction of X-axis while 480 picture elements are contained in the direction of Y-axis. If the image represents a uniform gray image information, for example, all the picture elements in the digital image have an equal pixel value or density value for an ideal image. However, in practice, noises are present on signal levels and pixel values contain a degree of variation from pixel to pixel, and there can be no instance that all the pixels have an equal value. Nevertheless, if the variation among the pixels remains to be on the order of ±20 gradation levels for an arrangement utilizing 1024 gradation levels, the image on the screen would appear clearly uniform to the human eye.

When CCD or LCD elements which form an image processor have defects which cause the variation in the pixel value to exceed the order of ±20 gradation levels, or more specifically, if a pixel or pixels in question exhibit a pixel value of 500 when surrounding pixels generally have pixel values around 400, it is immediately notable upon sight that there exists some abnormality.

Such a pixel or pixels are referred to as "defects". When there is only one pixel isolatedly which exhibits a difference in the pixel value greater than a certain magnitude as compared with surrounding pixels, it is referred to as a point defect, and when such point defects are aligned on a line, they are referred to as line defect.

In addition, if a pixel, as considered as a single point, exhibits a pixel value which is not significantly different from the surrounding and cannot be recognized as a point defect, there may be an assemlage of such pixels agglomerated together to exhibit pixel values which are slightly higher or lower locally than the surrounding. It is also possible that a variation in the pixel value is greater in one area than in the others. In such an instance, we recognize an "unevenness" in such assemblage or area. A defect presented in this manner by an assemblage of pixels is referred to as area defect.

In LCD panel, it is necessary to provide an orientation for the liquid crystal molecules, and at this end, an orientation film is formed in contact with a liquid crystal layer on the surface of a glass substrate. The manufacturing process of LCD panel includes a rubbing step in which the orientation film is rubbed by a cloth in a given direction. Molecules of the liquid crystal which is injected between a pair of glass substrates have their elongate axes aligned parallel to each other in the direction in which the orientation film is rubbed. If the array of the liquid crystal molecules is rendered uneven, there results an unevenness in the light transmission, and therefore it will be seen that the rubbing operation represents a very important step for LCD panel. However, the manner of rubbing may be streaked and uneven for some reason. When the resulting LCD panel displays a generally uniform white image, a streaked unevenness in the brightness occurs in the displayed image, which unevenness is referred to as "rubbing line".

The purpose of an image quality inspection unit is to defect such defects to render a decision as to whether the image is acceptable or faulty. The inspection unit utilizes an image processing to deliver outputs representing the location or area of such defects and other information.

In the prior art, a thresholding operation is used to detect a point or a line defect in an image which is subject to the image quality inspection. Because of the nature of the point or the line defect that it is fundamentally detected as a single point defect, a defective pixel exhibits a pixel value which is sufficiently greater or less than a variation in the pixel value which occurs in the surrounding. Accordingly, the thresholding operation simply establishes a threshold, which may be exceeded by a brighter defective pixel to locate a defect or which may not be reached by a darker defective pixel to locate another defect. In this manner, the number of such defects or the pixel values of individual defects are delivered.

By contrast, a more complicated processing is required to detect an area defect. This is because pixel values in an area which should result in an area defect are buried in a variation in the pixel value of an area which does not produce an area defect to prevent a determination on the basis of information relating to individual pixels whether a particular pixel value represents a defect or a noise. In the current practice, the area defect is detected by a processing procedure as mentioned below, for example.

Initially, a median filtering operation is applied to an original image A of an object being examined to provide a filtered image B from which noise components occuring as points are removed. A difference image C between the filtered image B and the original image A is formed, thus providing an image for individual points which comprises only noise components. A binarization of the difference image c provides a binary image D. During the binarization, a pixel having a value equal to or above a threshold and which may be determined to be a defect is designated as an active pixel having a pixel value of 1, while pixels below the threshold are designated as having a pixel value of 0. It will be seen that active pixels in the binary image D which have the pixel value of 1 may represent a noise, a point defect or a component of a lineal or area defect. In the binary image D, a difference noted between an area which represents an area defect and another area which is not resides in the fact that pixels having the pixel value of 1 are agglomerated in an area representing an area defect while such pixels are sparsely located in an area which does not represent an area defect. Accordingly, an image processing operation is applied so as to remove an isolated point, namely, a pixel in question which has the pixel value of 1 and which is surrounded by eight adjacent pixels which have the designated pixel value of 0.

A labelling operation is then applied to the image from which isolated points are removed, and concatenated pixels are grouped together. Specifically, pixels having the designated pixel value of 1 are searched for among the binary image to be labelled, and any concentrated pixel having the pixel value of 1 is designated by the same label. In this manner, pixels having the pixel value of 1 which are grouped together agglomerate in an area corresponding to an area defect, thus increasing the area of each label or the number of pixels which belong to the same group. The area is calculated for each label, and only those labels are left which have an area exceeding a given value. Since noise components which do not represent an area defect are eliminated, this processing operation allows an area defect to be detected.

The above technique of defecting an area defect is already established. However, the detection with the described image quality inspection unit is not easy to implement inasmuch as the rubbing line is a brightness unevenness of an extremely low contrast, which is experimentally determined to be on the order of 2 to 3%, and which occurs attributable to a slight difference in the force with which the orientation film is rubbed. Since the contrast of the rubbing line is comparable to noises, a lowering of the threshold permits noises to be detected, thus preventing the selective detection of only the rubbing line from being achieved.

When a rubbing line occurs, the streak frequently occurs across an extensive area over the LCD image. As compared with the extensive area over which the unevenness occurs, the image quality inspection unit described above is limited to a small area in its capability to detect an area defect. For a defect having an area of unevenness which is as large as one-third the screen size, for example, information relating to an area defect which extends over such an extensive area will be lost at the time the difference image C is formed according to the prior art. At present, there is no available technique of detecting a defect which presents an unevenness over such an extensive area of the screen.

It is an object of the invention to provide a method of image processing which detects an area defect over an extensive area of the screen by quantification.

SUMMARY OF THE INVENTION

In accordance with the invention, a digital image data which is input is subject to a Wavelet transform on a screen on which the image is formed, an image energy quantity is determined for a combined area of X-axis and Y-axis high pass information contained in the Wavelet transformed image data, and an inspection, recognition and/or decision is performed or rendered for an object being examined on the basis of the image energy quantity.

According to another embodiment of the invention, input digital image data is subject to a Wavelet transform on a screen on which the image is formed, pixel values of pixels for a combined area of X-axis and Y-axis high pass information contained in the Wavelet transformed image data are subject to a thresholding operation to provide a binary image data comprising active pixels "1" and non-active pixels "0", and the number of active pixels in the binary image data is counted.

The binary image or the binary image from which isolated points are removed may be displayed for rendering a decision.

An object being examined, which represents a source for the input digital image data, is determined to be acceptable or faulty, depending on whether or not the counted number of pixels is above a given value. Wavelet transform is a signal processing technique in which a signal in the time domain is transformed into a signal in the frequency domain for analysis, and a general description thereof is given in "An Introduction to WAVELETS" by Charles K. Chui published in 1992 by Academic Press, in particular, in Chapter 1: An Overview and Chapter 3: Wavelet Transforms and Time-Frequency Analysis. In the image processing, the time of the time domain is replaced by a position or X-coordinate of each pixel for processing in the X-axis direction, and the signal amplitude is replaced by the pixel value or brightness at that position, thus plotting the brightness against the position. Wavelet transform is applied to this coordinate system in the same manner as for the time-frequency analysis, proceeding the analysis in the similar manner subsequently. Wavelet transform applied to the image is disclosed in "Wavelets in Image Communication" by M. Barland, ELSEVIER, 1994.

Wavelet transform may be applied a plurality of times. Thus a combined area of X-axis and Y-axis low pass information contained in Wavelet transformed image data may be again subjected to Wavelet transform one more time or a plurality of times, and the resulting combined area of both X-axis and Y-axis high pass information may be subject to the binarization or the image energy may be determined therefrom.

BRIEF DESCRIPTION OF THE DRAWINGS

FIG. 4A is an example of one dimensional representation of an original image containing a rubbing line defect;

FIG. 4B shows an image data obtained after applying Wavelet transform to the image shown in FIG. 4A;

FIG. 4C shows an image data obtained after applying Wavelet transform to the image shown in FIG. 4B;

FIG. 4D shows an example of one-dimensional representation of an original image data containing rubbing line defect and noises;

FIG. 4E shows an image data obtained by applying Wavelet transform twice to the original image shown in FIG. 4D;

FIG. 5 shows a two-dimensional image which is obtained by arranging a series of one-dimensional images, each corresponding to the one shown in FIG. 4A and sequentially shifted by one pixel, one below another.

DESCRIPTION OF PREFERRED EMBODIMENTS

Figure 1:
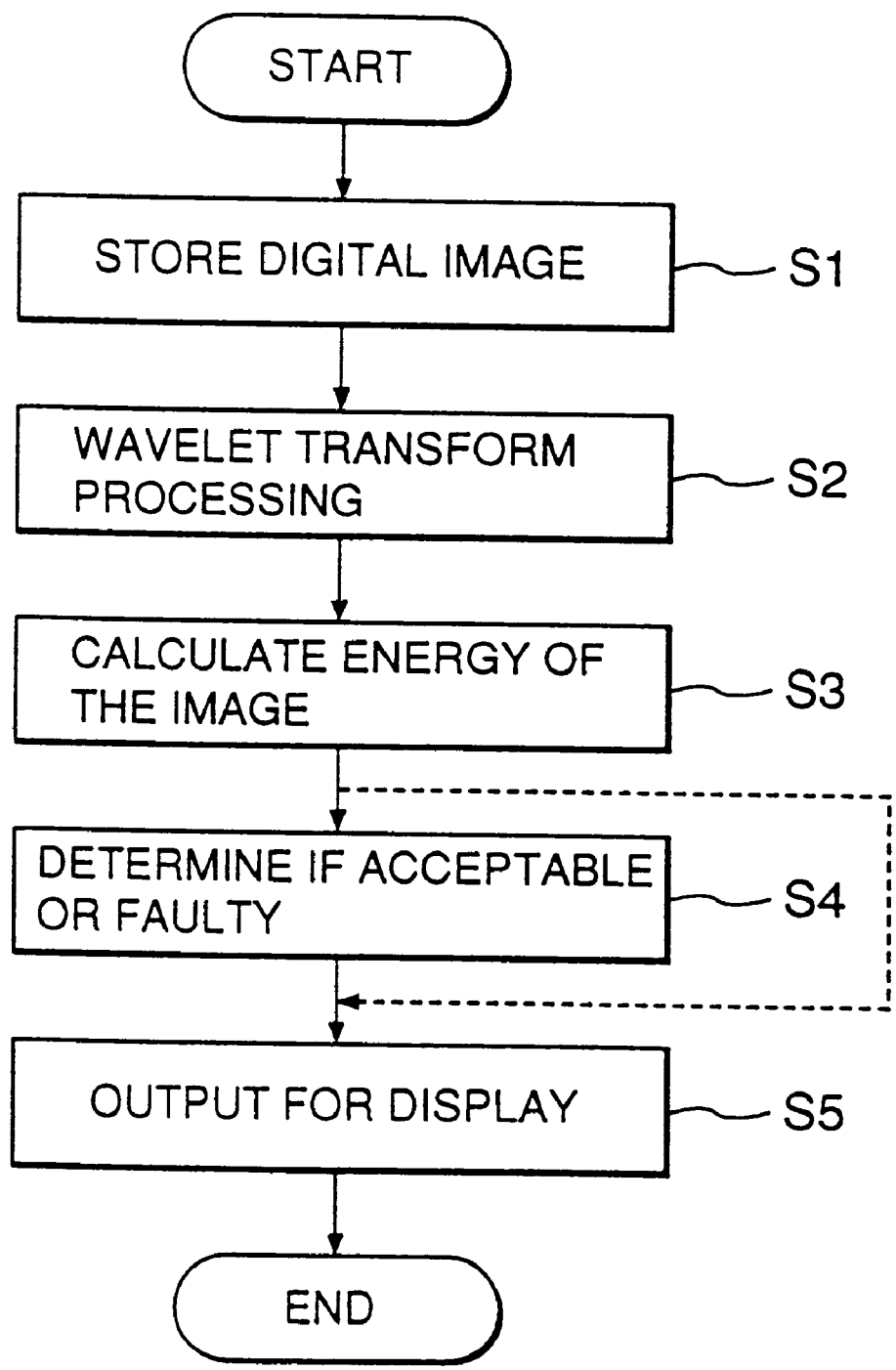
FIG. 1 is a flow diagram of a processing procedure according to an embodiment of the invention.
Figure 2A:
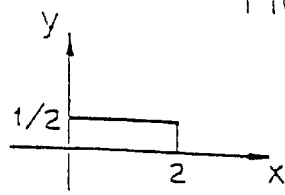
FIG. 2A shows an example of a scaling function.
Figure 2B:
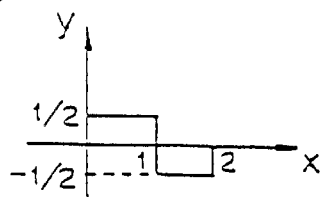
FIG. 2B shows an example of Wavelet function.
Figure 2C:
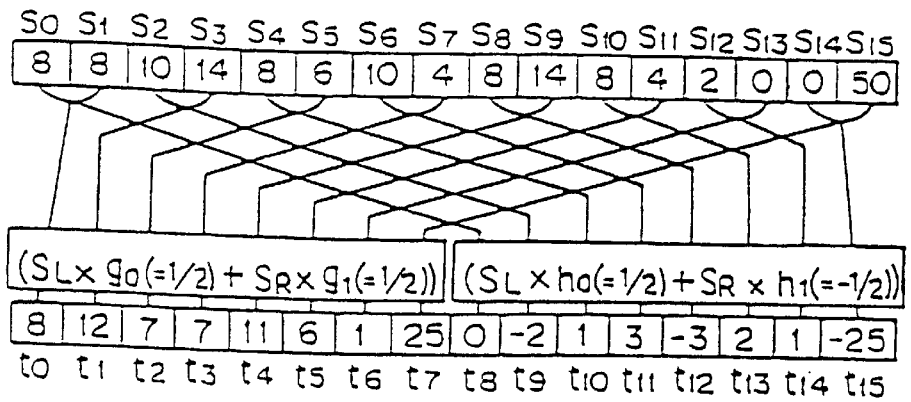
FIGS. 2C to 2E illustrate data values of a pre-transform progression s, data values of a post-transform progression t, a manner of change occurring in the data in the pre-transform progression s and a manner of change occurring in the post-transform progression t, as a specific example of one dimension Wavelet transform.
Figure 2D:
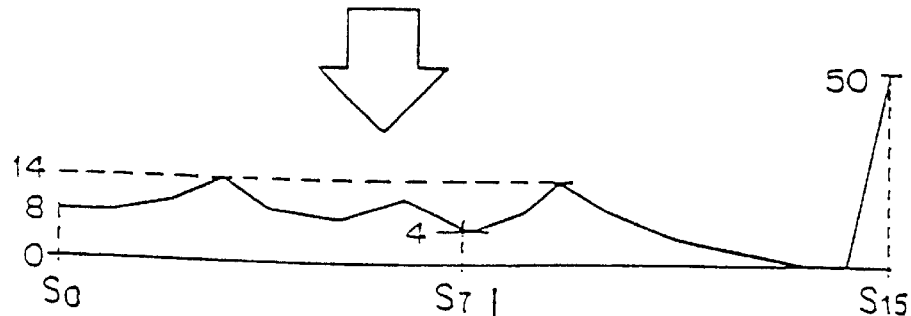
Figure 2E:
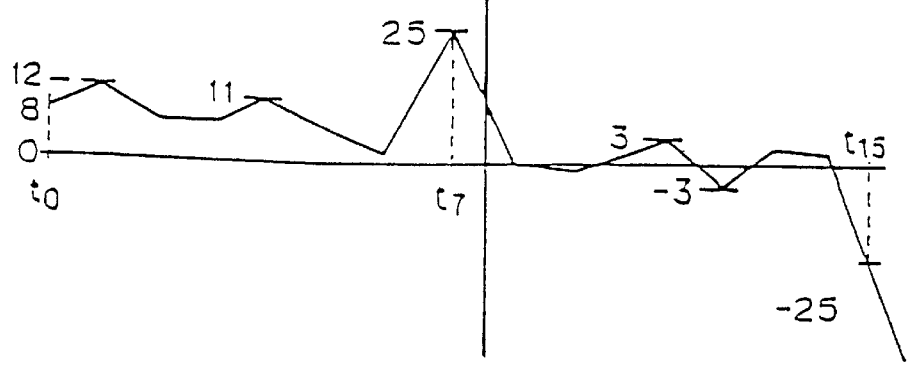

FIG. 1 shows an embodiment of the invention. Initially, a digital image data is accepted and stored in an image memory (S1). Wavelet transform is applied to the image data (S2). While the Wavelet transform is described in the literature cited above, it will be briefly described here.

Wavelet transform applied to an image data represents a two-dimensional Wavelet transform, which can be realized by a combination of one-dimensional Wavelet transform applied to the image in X-axis direction and one-dimensional Waveley transform applied in Y-axis direction. One dimensional Wavelet transform will be described first. There are many base functions which are used in performing the Wavelet transform, but Haar Wavelet, which is simplest in construction, is chosen here for purpose of description. It is to be noted that other Wavelet base functions (or filter coefficients for Wavelet transform) deliver substantially similar information even though a difference is noted only in the form of function.

During Wavelet transform, a base function is defined by two kinds of functions, namely, a scaling function and a Wavelet function. The scaling function serves delivering data smoothed information or low pass information while the Wavelet function serves delivering detail information of data or high pass information. For Haar Wavelet, scaling functions are given by $g_0=g_1=\frac{1}{2}$, and Wavelet functions are given by $$h_0=\frac{1}{2}, \text{ and } h_1=-\frac{1}{2}.$$

A progression $t_0, t_1, \ldots, t_{15}$ obtained after Haar Wavelet transform applied to a progression comprising sixteen numerial figures $S_0, S_1, S_2, \ldots, S_{15}$ is determined by calculations as indicated below.

$$t_0 = g_0 \cdot s_0 + g_1 \cdot s_1, \quad t_8 = h_0 \cdot s_0 + h_1 \cdot s_1$$
$$t_1 = g_0 \cdot s_2 + g_1 \cdot s_3, \quad t_9 = h_0 \cdot s_2 + h_1 \cdot s_3$$
$$t_2 = g_0 \cdot s_4 + g_1 \cdot s_5, \quad t_{10} = h_0 \cdot s_4 + h_1 \cdot s_5$$
$$\vdots \qquad \qquad \vdots$$
$$t_7 = g_0 \cdot s_{14} + g_1 \cdot s_{15}, \quad t_{15} = h_0 \cdot s_{14} + h_1 \cdot s_{15}$$

FIG. 2 illustrates a Haar Wavelet transform of a specific progression (data) comprising sixteen numerical figures. Specifically, FIG. 2A shows the scaling functions while FIG. 2B shows the Wavelet functions. When the Wavelet transform is applied to the progression $S_0, S_1, \ldots, S_{15}$ shown in FIG. 2C, each pair of immediately adjacent figures in the progression is taken out as a set successively, thus providing eight sets. The left-hand figure $S_L$ in each set is multiplied by $\frac{1}{2}$ (=$g_0$) and the right-hand figure $S_R$ in each set is multiplied by $\frac{1}{2}$ (=$g_1$). Each product is added together to provide a corresponding member of the progression $t_0, t_1, \ldots, t_7$. Similarly, for each of the eight sets, the left-hand figure $S_L$ is multiplied by $\frac{1}{2}$ (=$h_0$) and the right-hand figure $S_R$ is multiplied by $-\frac{1}{2}$ (=$h_1$). Each product is added together to provide a corresponding member of the progression $t_8, t_9, \ldots, t_{15}$. When the progression s having specific values as indicated in FIG. 2C is operated upon in this manner, there results the progression t having specific values as indicated in FIG. 2C. The first half $t_0, t_1, \ldots, t_7$ of the progression t comprises a low pass information having half the total length of the original progression s which is obtained as a result of the original progression s being operated upon by the scaling functions. The second half $t_8, t_9, \ldots, t_{15}$ of the progression t comprises a high pass information having half the total length of the original progression s which is obtained as a result of the original progression s being operated upon by the Wavelet functions. FIG. 2D graphically shows the progression s while FIG. 2E graphically shows the progression t. In each Figure, the abscissa represents the ordinal number of the numerical figures in the progression, and the ordinate indicate the numerical value.

It will be understood that the resolution is degraded by a factor of two as compared with the original image when the Wavelet transform is applied, but both the low pass and the high pass information of the original signal can be obtained simultaneously. As compared with the original signal having the resolution of 16, the progression $t_0$–$t_{15}$ obtained by one application of the Wavelet transform provides the low pass and the high pass information each having the resolution of 8. When a noise is present in the original signal, as illustrated by $S_{15}$=50 in FIGS. 2C and 2D which far exels other numerical figures in magnitude, information of $t_{15}$=−25 having a much greater value is delivered due to the noise even though the high pass information of the progression t generally exhibits values which are small in absolute magnitude. Thus it will be seen that the Wavelet transform can be utilized to advantage in detecting a noise component in the original data.

Figure 3B:
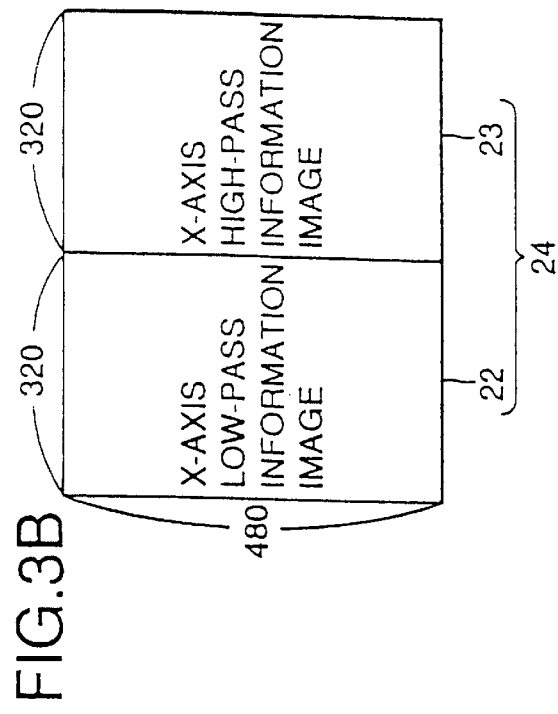
FIG. 3B shows an image obtained after the application of Wavelet transform in X direction to the original image shown in FIG. 3A.
Figure 3D:
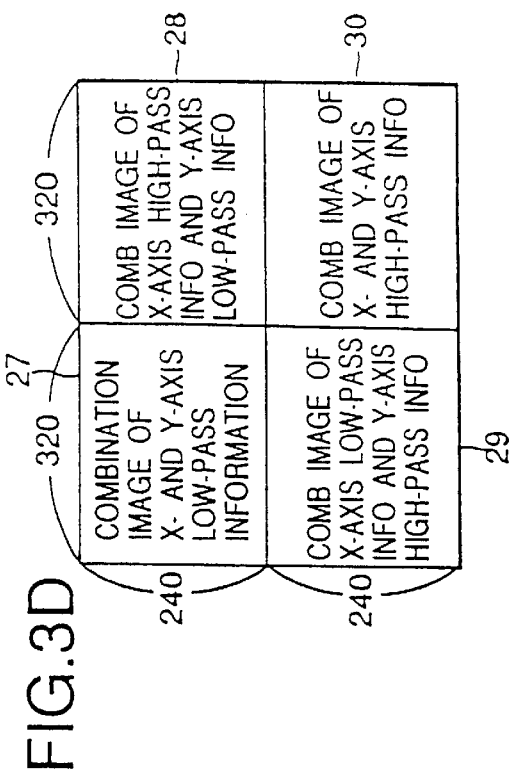
FIG. 3D illustrates combined values of pixels shown in FIGS. 3B and 3C.
Figure 3A:
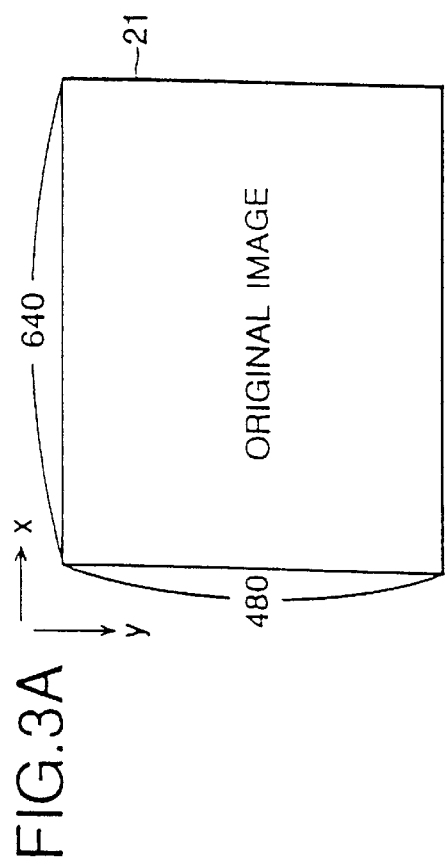
FIG. 3A shows an original image.
Figure 3C:
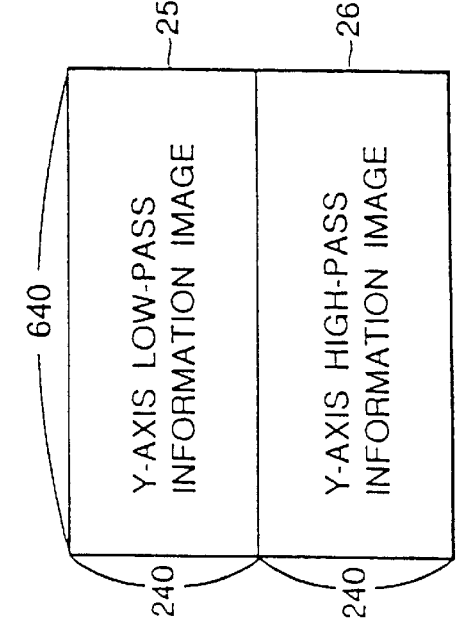
FIG. 3C shows an image obtained after the application of Wavelet transform in Y direction to the image shown in FIG. 3B.

The Wavelet transform described above is applicable to a two-dimensional image data such as LCD image. A specific application of the Wavelet transform to the image data is shown in FIG. 3. In the example shown in FIG. 3, an original image (FIG. 3A) comprises 640×480 digital data. Initially, the Wavelet transform is applied to the image in X-axis direction, thus in the similar manner as applied to one-dimensional data. More specifically, 640 data items aligned in X-axis direction are treated as 480 members of a progression (one-dimensional data), to each of which the Wavelet transform is applied. The result is shown in FIG. 3B where the screen is divided into two parts laterally, with low pass information image 22 on the left side and high pass information image 23 on the right side. The Wavelet transform is then applied to the 640×480 image 24 shown in FIG. 3B, now in Y-axis direction. Specifically 480 data items aligned in Y-axis direction are treated as members of a progression (one-dimensional data), and the Wavelet transform is applied to each of 640 progressions thus formed. This yields a 640×480 image shown in FIG. 3C. In FIG. 3C, the screen measuring 640×480 is divided into two vertical portions, with a Y-axis low pass information image 25 on the upper side and a Y-axis high pass information image 26 on the lower side. According, it follows that the image obtained in FIG. 3C comprises, when the screen of the same size 640×480 as the original image is divided into four parts as indicated in FIG. 4D, X-axis and Y-axis low pass information image 27 in the upper left quarter, a combined image of X-axis high pass information and Y-axis low pass information in the upper right quarter, a combined image 29 of X-axis low pass information and Y-axis high pass information in the lower left quarter, and X-axis and Y-axis high pass information image 30 in the lower right quarter of the screen. In the present example, transform in X-axis direction took place initially, and is followed by transform in Y-axis direction. However, if the sequence of X- and Y-transforms is interchanged, the completely same image as shown in FIG. 3D is obtained after the ultimate two-dimensional Wavelet transform.

An original image as handled in LCD tester or CCD tester is usually an image having a generally uniform gradation such as gray. When the Wavelet transform is applied to such image and if the image is a clear one free from any defect, very few data appears in the image including the high pass components which results from the Wavelet transform, or in the transformed images other than the X-axis and Y-axis low pass information image (shown at 27 in FIG. 3D), merely presenting noise components thereon which may be developed as when the image is accepted and stored, and almost all of the pixels have values close to 0. However, if the original image contains an area defect of an area above a certain magnitude, pixels having high pixel values appear concentrated in an area, where the area defect is present, of the high pass information image which results from the Wavelet transform. A binarization, a removal of isolated points and a labelling operation may be applied to the high pass information image, allowing the area defect to be detected in the similar manner as in the prior art.

It is to be noted that a significant distinction of the manner of detecting a defect in an image according to the invention from a corresponding manner of the prior art resides in the fact that each image obtained through the Wavelet transform is reduced to one-quarter in area as compared with the original image, and this is equivalent to converting the original image into blocks each measuring 2×2 pixels as far as the application of the binarization or removal of isolated points or other processing operation to the Wavelet transformed image is concerned. Hence, the possibility increases that a component of the area defect which would have been eliminated together with noises during the removal of isolated points according to the conventional practice may survive.

The image which results from the Wavelet transform as low pass information in both X- and Y- directions (namely, portion 27 shown in FIG. 3D) is minified to one quarter the size of the original image, and accordingly, Wavelet transform can be applied to this image once again, producing a further reduction in size by a factor of 4 and thus resulting in an image which is one-sixteenth as large as the original image. When the image processing as mentioned above is applied to the X-axis and Y-axis high pass information portion of this transformed image, the area defect can be detected in a similar manner. Since the image processing in this instance is equivalent to processing the original image as divided into blocks each measuring 4×4 pixels, an area defect extending over a more extensive area can be accommodated for than over the area which can be accommodated for by the image processing used with single Wavelet transformed image. When the Wavelet transform is applied to the X-axis and Y-axis low pass information portion of the image which is minified by a factor of 16, this is equivalent to converting the original image into one which occupies an area equal to ¹⁄₆₄ the original image or into blocks each measuring 8×8 pixels. A repeated application of the same Wavelet transform recurrently in this manner is referred to as multiple resolution analysis. In such instance, the initial application of Wavelet transform is referred to as Wavelet transform of level 1, and the application of the same Wavelet transform to X-axis and Y-axis low pass information portion of the image which results from the Wavelet transform of level 1 is referred to as Wavelet transform of level 2.

An unevenness in brightness as caused by rubbing line which exhibits a low contrast, but which extends over an extensive area of the screen has been difficult to detect according to the conventional processing technique which is based on each individual pixel because it is blended with noises indistinguishably. However, with the block processing technique mentioned above which utilizes the Wavelet transform, its detection is facilitated and enabled in a reliable manner.

The direction along which the rubbing line runs depends on the direction along which the orientation film is rubbed. However, this direction is definitely fixed, and is generally at an angle of 45° with respect to X-axis. Hence, the rubbing lines also runs at about an angle of 45° with respect to X-axis. Accordingly, when it is desired to detect the rubbing line from the result of the Wavelet transform applied, it is sufficient to pay attention only to both X-axis and Y-axis high pass information portions (portion 30 shown in FIG. 3D) from the result of the transform which indicate the presence of any obliquely running linear component.

In the X-axis and Y-axis high pass information portion 30 from the result of the Wavelet transform, one pixel therein corresponds to a plurality of pixels in the original image. Specifically, for Wavelet transform of level 1, one pixel corresponds to 2×2=4 pixels, and for Wavelet transform of level 2, one pixel corresponds to 4×4=16 pixels. Accordingly, noise components associated with a unit pixel that has no defect are averaged out, and the influence of noise components in the unit pixel upon the transformed pixels is reduced, thus bringing pixel values closer to 0. By contrast, where the rubbing line is present, small high and small low pixel values are alternately repeated with a given interval, causing the Wavelet transformed pixels to assume high and low pixel values. As a consequence of this, a difference in the pixel value between adjacent pixels increases, and it follows that pixel values of the pixels in the X-axis and Y-axis high pass information portion lie higher in absolute magnitude than pixel values in an area which is free from the rubbing line.

Where the rubbing line extends over an extensive area of the image, there are an increased number of pixels having a greater absolute magnitude of pixel values in the X-axis and Y-axis high pass information portion from the result of the Wavelet transform. Consequently, by quantifying the image energy over such area collectively or by quantifying the absolute magnitudes of pixel values of the respective pixels, it is possible to determine the presence or absence of the rubbing line.

The quantification of the absolute magnitudes of pixel values across the entire screen may take place by binarizing the absolute magnitudes of the pixel values according to a threshold and counting the number of pixels which have pixel values equal to or above the threshold. However, in the present embodiment, the accepted image data is subject to Wavelet transform ($S_2$) and the image energy in X-axis and Y-axis high pass information portion is calculated and is then utilized in the image quality inspection ($S_3$), as shown in FIG. 1. The image energy E is defined as follows:

$$E = \sum_{i=1}^{N} \times (i)^2 / N$$

where N represents the total number of pixels contained in the screen and x(i) represents the pixel value of each pixel. When the value of the image energy E thus obtained is greater, a decision can be rendered that the rubbing line exists.

As a criterion, a threshold may be set up for the magnitude of the image energy E, and a decision may be rendered (S4) that if the threshold is exceeded, the image is a faulty one that contains the rubbing line while if the threshold is not exceeded, the image is for an acceptable product, and such a result of decision is delivered as output for display (S5).

Alternatively, the image energy E determined may be delivered for display in a manner to allow the degree to which components representing obliquely running lines are contained in the original image to be known quantitatively (S5). In the described embodiment, the Wavelet transform, the calculation of the image energy quantity and the decision of acceptable or faulty image can be implemented in a computer.

Referring to FIG. 4, the function and the effect of the invention will be described more specifically.

In FIG. 4, an image is simplified into a progression a (i) of one-dimensional pixel values. In the description to follow, it is assumed that the progression represents an image. FIG. 4 shows an image comprising 40 pixels. The image has a background having pixel values equal to 0, and it is noted that two defective pixels having a pixel value of 4 are juxtaposed to each other and that the two defective pixels occur periodically at an interval of four pixels. It is assumed that the periodic occurrence of defects represents a rubbing line. In actuality, if the progression a (i) is repeated vertically while shifting the location of the defective pixel having the pixel value of 4 by one pixel position for each row in a manner illustrated in FIG. 5, rubbing lines running down and to the left are reproduced on the two-dimensional image. When the Wavelet transform is applied to the progression a (i), a progression b (i) as shown in FIG. 4B is produced. Progression b (0)–b (19) represents low pass information for the original image while progression b(20)–b(39) represents high pass information for the original image. It will be noted that no feature can be admitted in the high pass information obtained as the result of the Wavelet transform, and accordingly, a defect cannot be detected at this stage. While defects, i.e. pixel values of 4, still appear periodically in the low pass information, they exist as isolated points and hence cannot be distinguished from noise. Thus, the Wavelet transform is again applied to the progression b(0)–b (19) in the low pass information. FIG. 4C shows a progression c(i) which is the result of the Wavelet transform of level 2. It is to be noted that progression c(0)–c(9) represents the low pass component of level 2 for the original image while progression c(10)–c(19) represents the high pass component of level 2 for the original image. Progression c(20)–c(39) remains the same as the progression b(20)–b(39), and represents the high pass component obtained by the Wavelet transform of level 1 for the original image. Attention is now directed the progression c(10)–c(19) in the high pass information from the Wavelet transform of level 2, and its energy is determined as follows:

$$E = \sum_{i=10}^{19} c(i)^2 / 10 = 2.4$$

This indicates the occurrence of a defective component.

Here, a noise as illustrated in FIG. 4D which is different from defect is mixed into the progression a(i) for the original image. Specifically, progression d(i) contains noises having a pixel value of 8 mixed into four locations corresponding to a(8), a(25), a(32) and a(38) of the progression a (i). When the Wavelet transform of level 2 is applied to this progression, there results a progression e(i) as shown in FIG. 4E. The energy of the progression e(10)–e(19) in the high pass component from the wavelet transform of level 2 applied is obtained as follows:

$$E = \sum_{i=10}^{19} e(i)^2 / 10 = 2.4$$

thus assuming the same value of energy as for the progression c(10)–c(19) in the high pass component from the Wavelet transform of level 2 applied to the progression a(i) which is free from noise. In the prior art practice, it has been difficult to distinguish between a defect component formed by two consecutive pixels both of pixel value 4 and a noise having a pixel value of 8. However, when the statistical technique of Wavelet transform is employed to take advantage of the feature that the defect extends over an extensive area even though individual defect component may have a small pixel value, the influence of noise is reduced, allowing the defect component to be corrected for quantification.

When the same processing operation is applied to an image which is free from such a periodic noise, the energy E is calculated to be close to 0. Accordingly, by choosing a suitable threshold, it is possible to determine whether the image quality under the influence of the rubbing line component is acceptable or faulty.

Figure 6:
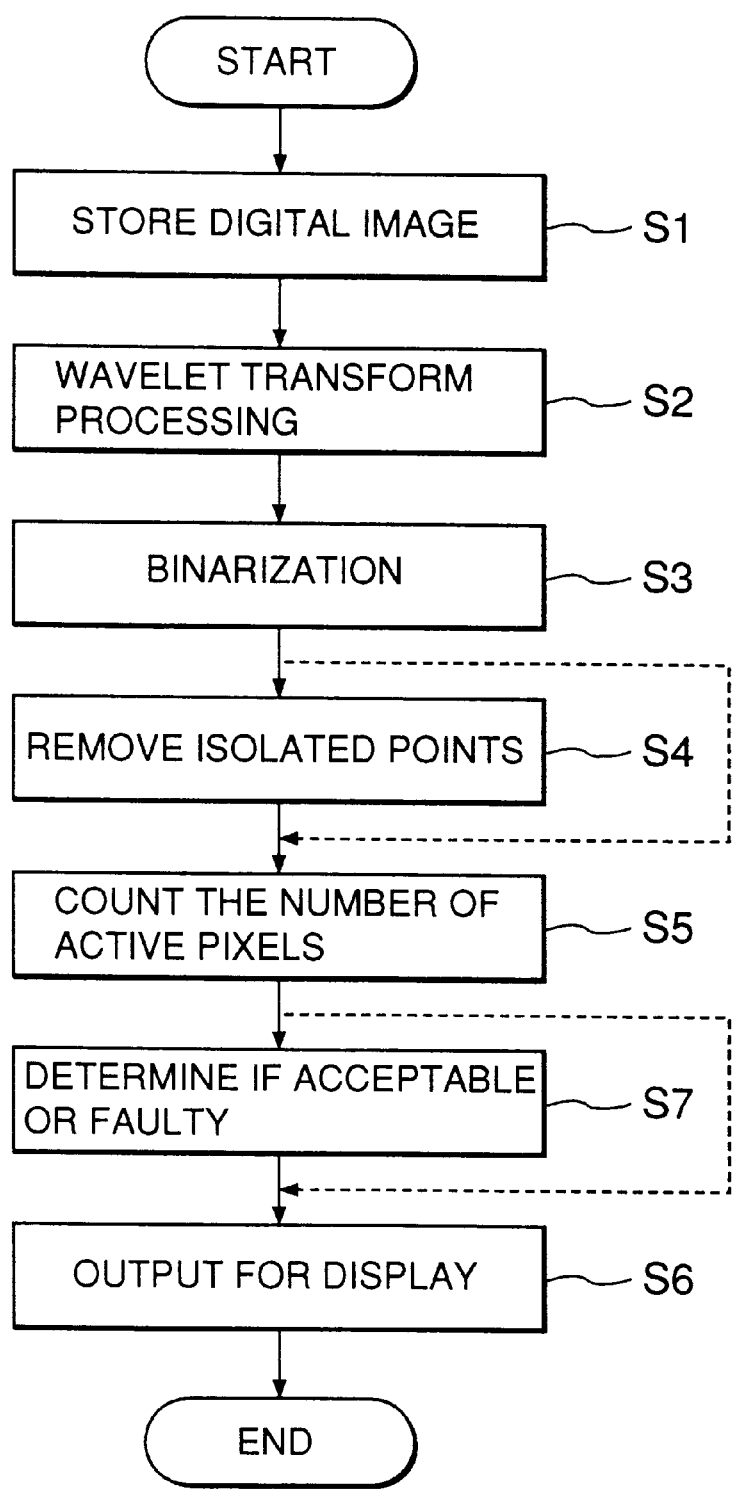
FIG. 6 is a flow diagram of a processing procedure according to another embodiment of the invention.

While in the foregoing description, the image energy is calculated subsequent to the application of the Wavelet transform, the Wavelet transform may be followed by the binarization in the similar manner as in the prior art. Thus, referring to FIG. 6, a digital image is accepted and stored (S1), the Wavelet transform of level 2 is applied to it (S2), and subsequently, the binarization is applied to both X-axis and Y-axis high pass information portion (portion 30 shown in FIG. 3) to designate active and non-active pixels or to form a binary image comprising pixel values of 1 and 0 (S3). A threshold in the binarization may simply be one which distinguishes between positive pixel values and pixel values equal to or below 0. Removal of isolated points is applied to the binary image (S4). Such operation may take place in the same manner as used in the prior art. Since most of the noise components are isolated points, the removal of isolated points eliminates substantially all of noises other than the area defect. In other words, almost all of pixels in the image which have a pixel value of 1 represent part of the area defect or a defet resembling a rubbing line.

Accordingly, the number of pixels in the image which have a pixel value of 1 or the number of active pixels is counted (S5), a decision is rendered determining an acceptable product or a faulty product in accordance with the count which may be below or above a given criterion (S6), and the result of this decision is delivered for display, for example (S7). Alternatively, rather than rendering a decision as to whether the product is acceptable or faulty, the number of counted active pixels may be delivered for display, allowing the degree of the image quality to be recognized.

As a modification, the removal of isolated points or step S4 may be omitted, and the binary image may be directly fed to the counting step S5. Thus, a single application of the Wavelet transform reduces the area of X-axis and Y-axis high pass information portion by a factor of four, and accordingly, the influence of isolated points is reduced by the same factor, as mentioned previously. Hence, if the Wavelet transform is applied three times, for example, the influence of isolated point pixel will be negligible. This means that if a maximum value of an isolated point pixel is on the order of 60 to 70 times a normal value, the step S4 of removing isolated points can be omitted when the Wavelet transform is applied three times.

As will be understood from the foregoing description, the use of the binarization similarly achieves the advantage resulting from the application of the Wavelet transform as mentioned in the embodiment utilizing the calculation of the image energy.

As discussed, in accordance with the invention, the Wavelet transform is applied to an image of an object, the image quality of which is to be examined, and the detection of a defect takes place with respect to X-axis and Y-axis high pass information from the result of transform. In this manner, the decision of the presence or absence of a defect such as a rubbing line which exhibits a very low contrast, which is streaky and which extends over an extensive area as well as the determination of the degree of such defect are facilitated and can be performed in a reliable manner.

What is claimed is:

1. A method of inspecting an area defect on an image display panel capable of displaying a two-dimensional digital image which comprises a plurality of pixels disposed in orthogonal X and Y axes in the digital image, said method comprising the steps of:

obtaining original two-dimensional image data representing respective pixel values of respective pixels of an original two-dimensional digital image from a display panel to be inspected when said panel is so operated as to display said original two-dimensional digital image at a uniform gradation state;

applying two-dimensional Wavelet transform to the original two-dimensional digital image data to thereby obtain a two-dimensional Wavelet transformed digital image which has an X-axis and Y-axis low pass information image portion, an X-axis high pass information and Y-axis low pass information image portion, an X-axis low pass information and Y-axis high pass information image portion, and an X-axis and Y-axis high pass information image portion, each of which is reduced to one-quarter in area as compared with that of the two-dimensional original digital image and includes a plurality of blocked pixels each measuring 2×2 pixels of the original digital image; and determining whether or not the display panel under inspection is defective based on the pixel values of the blocked pixels of the X-axis and Y-axis high pass information image portion of the Wavelet transformed digital image.

2. The method according to claim 1, wherein said determining step comprises the steps of:

calculating an image energy of the blocked pixels of the X-axis and Y-axis high pass information image portion of the two-dimensional Wavelet transformed digital image, and determining if the display panel under inspection is acceptable or faulty depending on whether the calculated image energy is below or above a given threshold value.

3. The method according to claim 2, wherein the step of calculating the image energy E is performed from the formula:

$$E=\Sigma^{N}_{i=1}x(i)^2/N$$

where N represents the total number of the blocked pixels each having a pixel value equal to or above a threshold value and contained in the X-axis and Y-axis high pass information image portion, and x(i) represents the pixel value of the respective blocked pixels.

4. The method according to claim 1, wherein said determining step comprises the steps of:

calculating an image energy of the blocked pixels of the X-axis and Y-axis high pass information image portion of the two-dimensional Wavelet transformed digital image, and displaying the value of the thus calculated image energy to show a degree of inclusion of area defect in the display panel.

5. The method according to claim 1, wherein said determining step comprises the steps of:

applying a binarization operation to each blocked pixels of the X-axis and Y-axis high pass information image portion of the two-dimensional Wavelet transformed digital image to thereby obtain a binary image formed by active and non-active pixels depending on whether pixel value of each said blocked pixel is above or below a given threshold value, counting number of the active pixels in the binary image, and determining if the display panel under inspection is acceptable or faulty depending on whether the counted number of the active pixels is below or above a given threshold value.

6. The method according to claim 5, which further comprises the step of:

removing isolated active pixels each of which is surrounded by non-active pixels in the binary image, wherein said step of counting the number of the active pixels is performed after removal of the isolated active pixels by the removing step.

7. The method according to claim 1, which further comprises the step of:

applying two-dimensional Wavelet transform to the X-axis and Y-axis low pass information image portion of the two-dimensional Wavelet transformed digital image, to thereby obtain a second two-dimensional Wavelet transformed digital image which includes an X-axis and Y-axis low pass information image portion, an X-axis high pass information and Y-axis low pass information image portion, an X-axis low pass information and Y-axis high pass information image portion, and an X-axis and Y-axis high pass information image portion, each of which is reduced to one-sixteenth in area as compared with that of the two-dimensional original digital image and has a plurality of blocked pixels each measuring 4×4 pixels of the original digital image; and wherein said determining step is performed based on the pixel values of the blacked pixels of the X-axis and Y-axis high pass information image portion of the thus obtained second two-dimensional Wavelet transformed digital image.

8. The method according to claim 7, wherein said determining step comprises the step of:

applying a thresholding operation to each pixel value of each said blocked pixel in the X-axis and Y-axis high pass information image portion of the second two-dimensional Wavelet transformed digital image to a given threshold value to thereby derive a binary image data formed by active and non-active pixels depending on whether the each pixel value is above or below the threshold value; and determining the display panel under inspection is either acceptable or faulty depending on whether the number of counted active pixels is below or above a given threshold value.

9. The method according to claim 7, which further comprises the step of:

applying two-dimensional Wavelet transform to the X-axis and Y-axis low pass information image portion of the second two-dimensional Wavelet transformed digital image, to thereby obtain a third two-dimensional Wavelet transformed digital image which includes an X-axis and Y-axis low pass information image portion, an X-axis high pass information and Y-axis low pass information image portion, an X-axis low pass information and Y-axis high pass information image portion, and an X-axis and Y-axis high pass information image portion, each of which is reduced to 1/64 in area as compared with that of the two-dimensional original digital image and has a plurality of blocked pixels each measuring M pixels of the original digital image; and wherein said determining step is performed based on the pixel values of the blocked pixels of the X-axis and Y-axis high pass information image portion of the thus obtained third two-dimensional Wavelet transformed digital image.

* * * * *